Patented Aug. 8, 1933

1,921,130

UNITED STATES PATENT OFFICE 1,921,130

MANUFACTURE OF RUBBER ARTICLES

Edward Arthur Murphy, Erdington, Birmingham, Eric William Bower Owen, Walmley, and Douglas Frank Twiss, Wylde Green, England, assignors to Dunlop Rubber Company Limited, London, England, a British Company No Drawing. Application August 6, 1931, Serial No. 555,528, and in Great Britain October 20, 1930

14 Claims. (Cl. 18—58)

This invention is concerned with improvements in the manufacture of rubber articles obtained by any one or more of the operations such as dipping, spreading, spraying or electrophoresis from aqueous dispersions of organic materials of the kinds hereinafter specified.

The object of the invention is to provide the aforesaid articles with wrinkled or corrugated or grained effects on their surfaces.

According to the invention the aforesaid effects are formed by bringing uncoagulated layers of the aforesaid dispersions into localized contact with single or mixed substances or agents either in the solid or dissolved form which effect concurrent coagulation and contraction by dehydration or syneresis or alternatively bringing them consecutively into localized contact with two substances or agents, again either in the solid or dissolved state, one of which effects coagulation and the other contraction by dehydration or syneresis. The contraction by dehydration or syneresis occurs locally.

Suitable materials for causing such local contraction and shrinkage effects may consist, for example of grains of water-soluble substances or droplets of solutions of substances capable of acting as coagulating and/or as dehydrating and setting solutions. Furthermore, the materials may consist of dry particles not necessarily soluble in water, e. g. plaster of Paris, which cause local coagulation and/or dehydration by capillary absorption of water followed, possibly, by chemical fixation of the same.

Particles of materials intermediate between the two above classes, i. e. sufficiently insoluble to be capable of capillary absorption of water, and sufficiently soluble to induce local coagulation may also be employed, e. g. lime, burnt alum, calcium sulphate.

As an example, grains of water-soluble substances such as common salt can be sprinkled or dusted over the surface of an uncoagulated latex layer when dehydration and coagulation of the surface occur locally at the points of contact with the salt grains, thereby causing local shrinkage and consequent ultimate depressions or pits in the finally dried surface.

As another example a dehydrating and setting solution such as is described in U. S. Patent 1,887,190, that is, salts of alkali metal and ammonium such as sodium chloride, or other salts, such as calcium or magnesium chloride, or fused salts or substances such as sodium acetate, thiosulphate, acetamide, ammonium acetate or ammonium formate, which melt below 100° C., is sprinkled sparsely over the uncoagulated surface when a similar effect is obtained.

As a further example the uncoagulated surface may be coagulated and dehydrated by sprinkling the surface with particles of water-absorbent materials such as dry starch grains, pumice particles and particles of dry cellulosic materials.

The dispersions of organic materials may be rubber or similar vegetable resins and may be either non-concentrated or concentrated, compounded, preserved natural or artificial, vulcanized or unvulcanized, and such dispersions may also contain such added substances as factice, rubber waste, rubber reclaim, mineral rubber, synthetic rubber or rubber-like substances, vulcanizing agents, accelerators, additional preservatives, dyes and filling materials of the ordinary type as well as such special materials as leather dust, cork dust, fibres, metal dust and colloidal metals. Such dispersions may also have admixed therein such artificial resins as phenol-aldehyde, protein-aldehyde and/or urea-aldehyde condensation products.

We have found that uncoagulated layers or deposits of the concentrated compounded dispersions obtained according to the process described in United States Patent No. 1,846,164 of February 23, 1932, that is, a compounded dispersion obtained by evaporation with gentle dispersive agitation of a mixture of rubber latex and compounding ingredients, are particularly suitable for the purpose of this invention.

An embodiment of the invention is as follows:—
A non-porous shape or former is dipped into a latex having a water content of 25% to 30% and a solid content of the following compositions:—

| | Parts by weight |
|---|---|
| Rubber as latex | 55.0 |
| Sulphur | 2.0 |
| Accelerator | 0.4 |
| Whiting | 13.0 |
| Zinc oxide | 3.0 |
| Barytes | 20.6 |
| Transformer oil | 5.0 |
| Colour | 1.0 |

The shape covered with the uncoagulated deposit of concentrated latex is then sprinkled or dusted over the surface of the uncoagulated deposit with grains of common salt. Dehydration and coagulation of the surface of the deposit occur locally at the points of contact with the salt grains, thereby causing local shrinkage and consequent depression or pits in the finally dried surface.

When necessary the subsequent setting of the layer after the formation of the wrinkling thereon can be effected by merely drying with or without heating or by the setting effects of heat or by immersion in a dehydrating and setting solution as described and claimed in Patent 1,887,190.

If desired the support or backing stratum or former may be given a prior coating of coagulating medium before applying the layer of aqueous dispersion of organic material.

Deposits obtained by electrophoresis which are substantially uncoagulated on their outer surface can also be treated according to the present invention so as to effect coagulation and contraction by dehydration and syneresis.

The supports or backing strata or formers may be of any suitable materials such as glass, metal, porcelain, clay or fabric. If desired, the formers may be internally heated in any suitable manner, for example, by passing a fluid heating medium through the moulds or by electrical heating.

Surfaces obtained according to the present invention can be produced with a degree of surface marking ranging from that of a fine ground glass to a coarse granular appearance according to the size of the grains of agent employed.

Master moulds or formers having the patterns or markings of the aforesaid kinds can be produced according to the present invention by the production of such deposition bases by the use of agents which effect local contraction by dehydration and/or syneresis, particularly on deposits obtained from aqueous dispersions of organic materials capable of giving a hard or soft vulcanized rubber composition on subsequent treatment. In this manner master formers or moulds can be produced provided with indentations, thus allowing the production of articles having markings formed by corresponding projections for example a surface having markings of the type described above, may be formed, using a compounded dispersion of a hard rubber composition which after being set and vulcanized has a surface indented correspondingly with scattered indentations. This surface may be used as one surface of a mould in which subsequent articles of flexible or hard rubber may be formed and vulcanized. Or a soft rubber surface may be similarly formed and vulcanized and used as a surface of a mould in which various articles may be moulded and set.

Such a type of marking has been found to be of use in the production of surgeons gloves and for non-slip surfaces generally.

A master pattern produced according to the present invention can be used for the production of, for instance, ceramic or plaster of Paris or metallic reproductions. The reproductions may then be used directly for the production of articles of or containing organic materials directly from aqueous dispersions or solutions thereof.

Whereas U. S. Patent 1,886,351 describes and claims inter alia a process for the manufacture of rubber articles from aqueous dispersions of organic materials of the kinds referred to therein wherein the articles are provided with wrinkled or corrugated or grained effects on their surfaces by bringing uncoagulated layers of the dispersions aforesaid into contact with single or mixed liquids which effect coagulation and swelling concurrently or into contact with two liquids one of which effects coagulation and the other swelling, according to the present invention uncoagulated layers of the dispersions specified herein are brought into localized contact with single or mixed substances or agents which effect concurrently localized or total coagulation and localized contraction by dehydration or syneresis, or consecutively into localized contact with two substances or agents one of which effects localized or total coagulation and the other local contraction by dehydration and syneresis.

In certain cases it is difficult to state definitely whether coagulation precedes the localized contraction or the localized contraction is prior to the coagulation action. In the main, however, it would appear that coagulation is to be followed by rapid localized contraction by dehydration or syneresis.

What we claim is:

1. A process for the manufacture of rubber articles from aqueous dispersions of the type described which comprises bringing uncoagulated layers of the aforesaid dispersions into contact with scattered particles of agents which effect concurrent coagulation and contraction.

2. A process for the manufacture of rubber articles from aqueous dispersions of the type described which comprises bringing uncoagulated layers of the aforesaid dispersions consecutively into contact with scattered particles of two agents which effect coagulation and contraction by dehydration.

3. A process as claimed in claim 1 wherein suitable materials for causing the aforesaid effects are grains of water-soluble substances capable of acting as coagulants and setting solutions.

4. A process as claimed in claim 1 wherein suitable materials for causing the aforesaid effects are grains of water-soluble substances capable of acting as coagulants and dehydrators.

5. A process as claimed in claim 1 wherein suitable materials for causing the aforesaid effects consist of dried particles insoluble in water.

6. A process as claimed in claim 1 wherein the particles employed consist of plaster of Paris.

7. A process as claimed in claim 1 wherein the particles of materials employed are intermediate between those completely soluble in water and insoluble in water, i. e. those sufficiently insoluble to be capable of capillary absorption of water and sufficiently soluble to induce local coagulation.

8. A process as claimed in claim 1 wherein the particles of material are hygroscopic, porous inorganic compounds.

9. The process as claimed in claim 1 wherein the particles of material employed are porous, inorganic materials soluble to some extent in water.

10. The process of claim 1 in which sodium chloride is sprinkled or dusted over the surface of the uncoagulated latex layer.

11. A process as claimed in claim 1 wherein the uncoagulated surface is coagulated and dehydrated by sprinkling the surface with particles of water-absorbent material.

12. A process as claimed in claim 1 wherein the layer is dried and set by heat after the formation of the wrinkling thereon.

13. A process as claimed in claim 1, wherein suitable materials for causing the aforesaid effects are droplets of solutions capable of acting as coagulants and dehydrators.

14. A process as claimed in claim 1, wherein the scattered particles are droplets of dehydrating solutions.

EDWARD ARTHUR MURPHY.
ERIC WILLIAM BOWER OWEN.
DOUGLAS FRANK TWISS.